United States Patent [19]

Utman et al.

[11] Patent Number: 4,648,618
[45] Date of Patent: Mar. 10, 1987

[54] TRAILER COUPLER LOCK WITH PROTECTIVE HOUSING

[76] Inventors: Leslie H. Utman, 7414 Big Cypress Dr., Miami Lakes, Fla. 33014; M. S. Rifkin, 50 E. 10th Ct., Hialeah, Fla. 33010

[21] Appl. No.: 743,358

[22] Filed: Jun. 11, 1985

[51] Int. Cl.⁴ .......................................... B60D 1/12
[52] U.S. Cl. ...................................... 280/507; 70/258
[58] Field of Search ............... 280/507, 511, 512, 434; 70/258, 231; 292/DIG. 39, DIG. 40; 248/298

[56] References Cited

U.S. PATENT DOCUMENTS

| | | | |
|---|---|---|---|
| 2,564,986 | 8/1951 | Meyer | 70/258 |
| 2,641,124 | 6/1953 | Gallagher | 280/507 |
| 2,833,559 | 5/1958 | Miner | 280/434 |
| 3,924,878 | 12/1975 | Utman et al. | 280/507 |

Primary Examiner—John A. Pekar
Attorney, Agent, or Firm—Nixon & Vanderhye

[57] ABSTRACT

A locking device for an assembled trailer hitch include a lock mounted within a protective metal housing. The lock is adapted to receive the legs of a U-shaped shackle. The lock is mounted for movement within the housing by mounting components connected to the lock by adhesive foam tape. One of the locking components includes a ramp making an angle generally about 30 degrees to the bottom of the housing for camming the shackle legs upwardly into operative association with the lock. At the top of the ramp upturned ears are formed which make an angle of about 30 degrees with respect to the direction of shackle movement to further cam the shackle legs into operative association with the lock.

18 Claims, 6 Drawing Figures

TRAILER COUPLER LOCK WITH PROTECTIVE HOUSING

BACKGROUND AND SUMMARY OF THE INVENTION

In U.S. Pat. No. 3,924,878 a highly desirable and effective apparatus is disclosed for protecting and shielding a coupler and padlock assembly of a trailer coupling while the trailer is coupled to a prime mover or other device or vehicle. The disclosure of the U.S. Pat. No. 3,924,878 is hereby incorporated by reference herein.

While the apparatus in the U.S. Pat. No. 3,924,878 is extremely effective, the particular structure illustrated therein is not as adaptable to as many different types of clamps associated with trailer hitches, or the like, as desirable. According to the present invention, the apparatus has been improved upon by making it more adaptable to a wider variety of clamps and couplers, and also easier to construct.

According to one aspect of the present invention, a locking device for an assembled trailer hitch having a clamp actuator of a clamp (operation of the clamp actuator releasing it from its assembled position) is provided. The locking device includes basic components of the U.S. Pat. No. 3,924,878 structure including a U-shaped shackle, means for allowing operative connection of the shackle to the clamp actuator, a housing member for substantially completely covering the clamp actuator and the shackle to prevent access thereto and operation thereof, and locking means for engaging the legs of the shackle and the housing member. The locking means comprises a key operated lock. The device also further comprises means for mounting the key operated lock adjacent a second closed end of the housing, opposite a first open end thereof, and the mounting means comprises means for mounting the lock so that it can move several degrees (e.g. about 6 degrees) so that it can readily move into alignment with the legs of the shackle. The mounting means mount the lock above the bottom of the housing and adjacent to the top, and ramp means are provided leading from the bottom to the locking means for guiding the shackle legs into the lock.

According to another aspect of the present invention, a metal housing having six faces is provided. The six faces include a first open end, a second closed end, a closed top, a closed bottom having a slot therein, and closed left and right sides. A lock is provided and mounting means mount in the lock within the housing adjacent the rear end and top thereof. The mounting means include first and second right angled plate portions connected to the lock by double faced adhesive foam tape. One of the right angle plate portions includes a ramp surface with cam portions thereon, which guides the shackle toward the lock.

It is the primary object of the present invention to provide an improved locking device for an assembled trailer hitch or the like. This and other objects of the invention will become clear from an inspection of the detailed description of the invention, and from the appended claims.

DETAILED DESCRIPTION OF THE DRAWINGS

Figure 1:
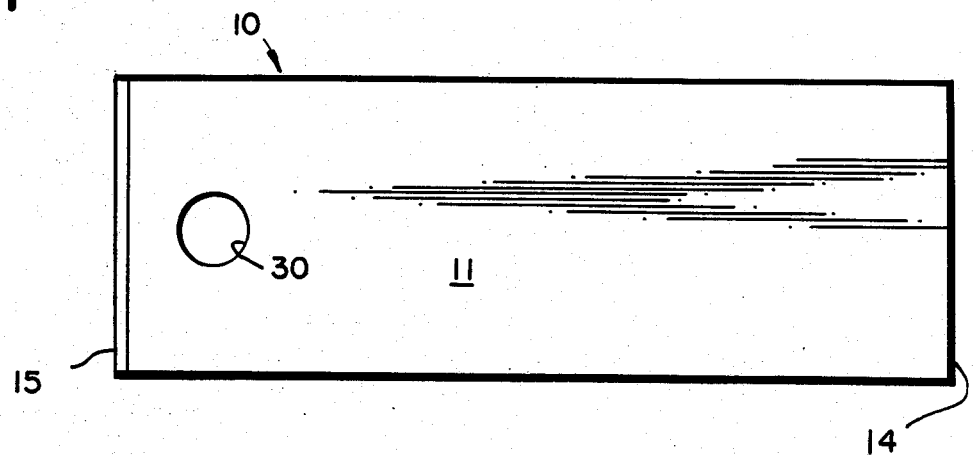
FIG. 1 is a top plan view of an exemplary protective housing according to the invention.
Figure 2:
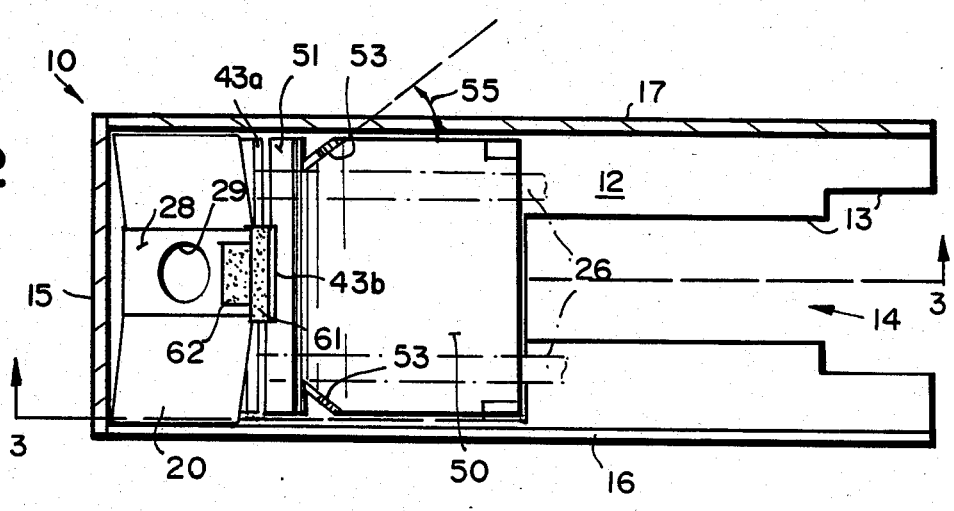
FIG. 2 is a top view, with the top face of the housing cut away, of an exemplary protective housing according to the invention.
Figure 3:
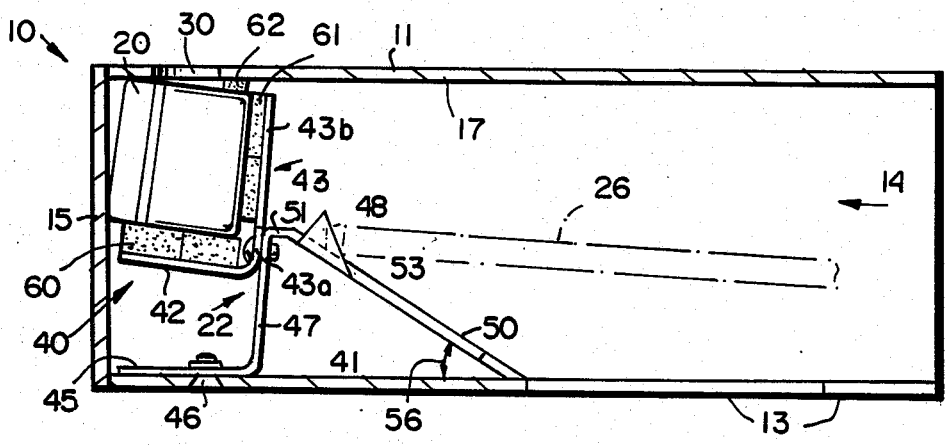
FIG. 3 is a left side view, taken along lines 3—3 of FIG. 2.

The locking device according to the invention includes as a primary component thereof the protective housing member 10 which includes a substantially closed top 11, a substantially closed bottom 12 with a slot 13 therein, a front open end 14, a rear closed end 15, and closed left and right sides 16, 17, respectively. The other major components of the locking device 10 include the actual lock 20, means 22 for mounting the lock, and a U-shaped shackle. The shackle is shown generally by reference numeral 24 in FIG. 6, and includes a closed end 25, and two legs 26, the legs 26 being shown in dotted lines in FIGS. 2 and 3.

The lock 20 may comprise any suitable lock, but preferably it is one supplied by Abus Lock Company of the Federal Republic of Germany, and comprises a lock which will engage and lock both of the legs 26 of the shackle 24 at the same time. As seen most clearly in FIGS. 2 through 5, the lock 20 has a top surface 28 in which a key-receiving opening 29 is formed. The opening 29 is in alignment with an opening 30 formed in the top face 11 of the housing 10. Sidewalls 31 slant downwardly from the top 28. In the front face 32 a pair of shackle receiving openings 33 are formed. Each opening includes a central portion 34 into which the shackle ultimately passes and within which it is locked in place by the interior locking components of the lock 20, and also includes a right circular cone frustrum portion 35 which leads to the portion 34. The surfaces 35 cam the shackle legs 26 into alignment with the openings 34 to be locked by the lock 20 interior components.

The mounting means 22 for mounting the key operated lock 20 mount the lock 20 adjacent the closed rear end 15 of the housing 10, and adjacent the top 11 thereof so that the key receiving opening 29 is in alignment with the opening 30 in the top face 11 of the housing 10. Mounting means 22 mount the lock 20 so that it can move several degrees, for example about 6 degrees, so that it can readily move into alignment with the legs 26 of the shackle, and irrespective of the details of the clamping mechanism of the trailer hitch with which it is associated.

Figure 4:
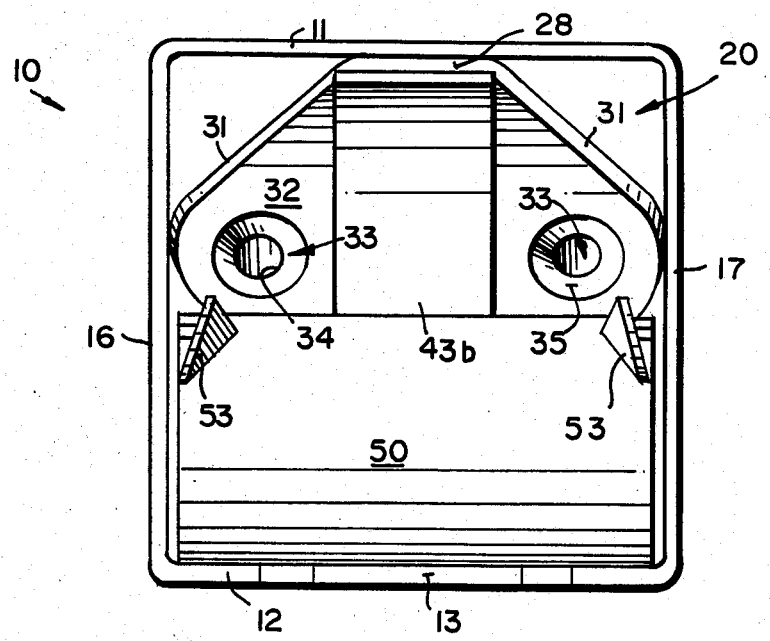
FIG. 4 is a front view of the device of FIGS. 1 through 3.
Figure 5:
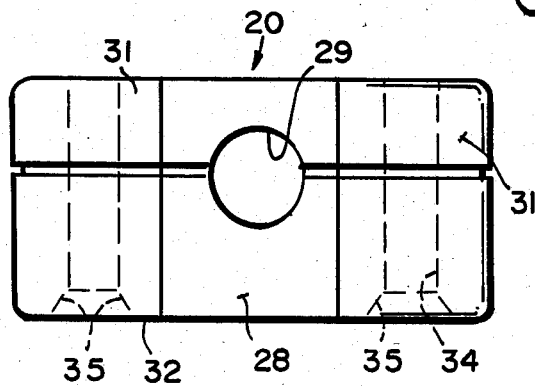
FIG. 5 is a top view of the actual lock, with the shackle-receiving bore shown in dotted lines, of the device of FIG. 1.

In the preferred embodiment illustrated in the drawings, the mounting means 22 comprises a first generally right-angle metal plate portion 40, and a second generally right-angle metal plate portion 41. The first plate portion 40 includes a bottom portion 42 thereof, and a side portion 43 thereof. The side portion 43 includes a bottom part 43a thereof which is substantially as wide as the bottom portion 42, as well as a thinned top portion 43b thereof which is narrower than the distance between the openings 33, as can be seen in FIG. 4. The bottom portion 42 is substantially as wide as the bottom of the lock 20.

The second plate portion 41 of the mounting means 22 includes a bottom engaging flat portion 45 which is affixed to the bottom 12 of the housing 10 by a pair of flat head screws 46. An intermediate portion 47 thereof makes slightly more than a right angle connection to the bottom portion 45 thereof. At the top of the portion 47 it is pop riveted, as by a pair of pop rivets 48, to the bottom section 43a of the plate portion 43 of the first component 40 of the mounting means 22.

Extending from the portion 47 of the mounting component 41 is a ramp means for guiding shackle legs 26 into operative engagement with the lock 20. The ramp means includes a generally flat ramp surface 50 which engages the bottom 12 of the housing 10 at one end thereof (but is not rigidly connected to the bottom 12), and extends approximately as far as the rear of the slot 13, and at the second end thereof is connected by the generally flat portion 51 to the portion 47. Adjacent the top of the ramp 50 just prior to the flat portion 51 are a pair of upturned ears 53. The ears 53 make an angle 55 with the edge of the ramp 50 (see FIG. 2), the angle 55 preferably being approximately 30 degrees. The ears 53 comprise cam surfaces for engaging the shackle legs 26, if necessary, to guide them into alignment with the openings 33. The ramp 50 itself makes an angle 56 (see FIG. 3) with the bottom 12 of the housing 10, the angle 56 preferably being approximately 30° (e.g. about 31–32 degrees).

The lock 20 is mounted to the first component 40 by a structure which allows some limited movement of the lock 20 so that it can align with and receive the shackle legs 26 for a wide variety of trailer hitch clamps, and the like. This is preferably accomplished by pieces of adhesive foam tape, including one piece, or series of pieces, 60 connecting the bottom of the lock 20 to the bottom portion 42 of the first locking component 40, and the tape section or sections 61 which connect a portion of the front surface 32 of the lock 20 to the thinned portion 43b of the locking component 40. Also it is desireable to provide a small section of double faced adhesive foam tape, 62, connected between the top surface 28 of the lock 20 and the top face 11 of the housing 10, adjacent the opening 30.

Figure 6:
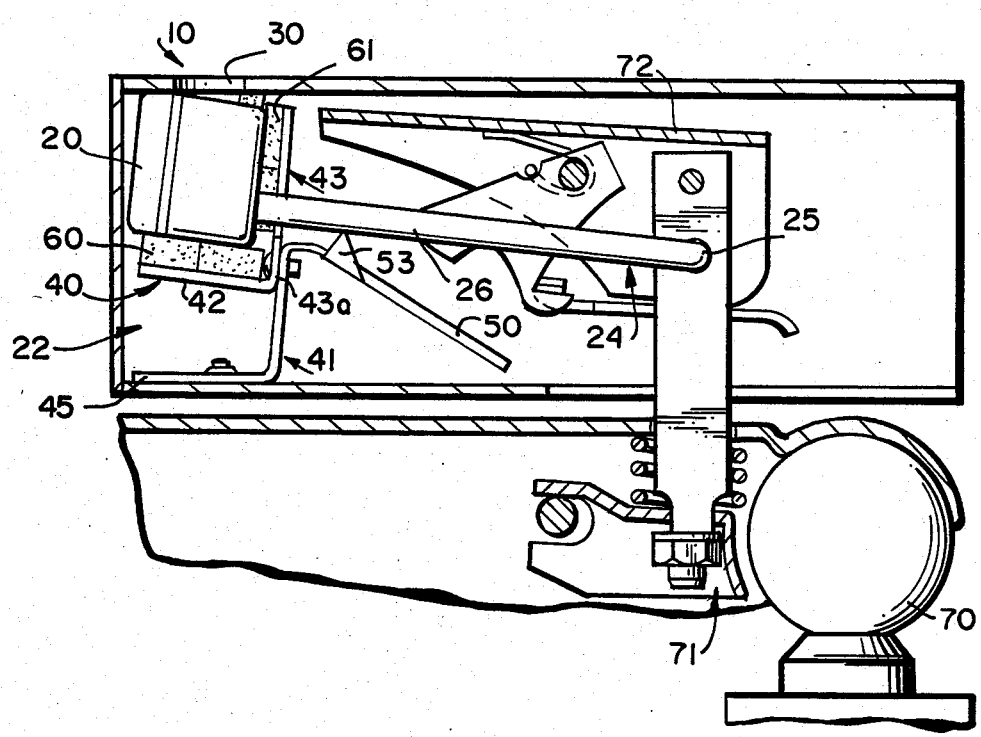
FIG. 6 is a view like that of FIG. 3 only showing the lock within the protective housing receiving a clamping mechanism of a trailer hitch.

FIG. 6 shows the locking device according to the invention in association with a trailer hitch. A trailer hitch assembly is adapted to be connected to a conventional hitching post 70 of a prime mover, such as on the bumper of a car. These components are illustrated in exemplary form only in FIG. 6, and are more fully described in said U.S. Pat. No. 3,924,878, and include clamping component 71 which is actuated by a clamp actuator (lever) 72. Note that the closed portion 25 of the shackle 24 is operatively connected to the clamp actuator 72.

In the assembly and operation of the locking device according to the present invention, after construction of the protective housing 10 the lock mounting components 40, 41 are fastened together, and the lock 20 is mounted to the component 40 utilizing the foam adhesive tape 60, 61, with a section 62 also disposed on the top surface 28 of the lock 20. The components 40, 41 are fastened together by one or more fasteners 48. The entire lock 20 and mounting means 22 is then slid into the housing 10 through the open front end 14 thereof, and the screws 46 are utilized to attach the flat portion 45 to the bottom 12 of the housing 10, with the key-receiving opening 29 of the lock 20 in alignment with the opening 30.

To use the locking device all that is necessary is to slide the open end 14 thereof into operative association with the lever 72 and the shackle legs 26. The shackle legs 26 will engage the ramp 50 and be cammed upwardly toward the lock 20, and will be cammed inwardly by the ears 53 so that they engage the conical surfaces 35 and enter the portions 34 of the openings 33. Movement is continued until the lock 20 lockingly receives the shackle legs 26. In this position (illustrated in FIG. 6) the clamp actuator 72 is completely protected so that it cannot be operated to release the clamp onto the ball 70, and so that the housing 10 may not be moved with respect to the clamp actuator 72. Only individuals with a key for unlocking the lock 20 can allow separation of the housing 10 and clamp actuator 72 to allow releasing of the clamp onto the prime mover. Such unclamping action is accomplished merely by inserting the key through the opening 30 into the key receiving opening 29 of the lock 20, and turning it to the position so that the lock 20 releases the shackle legs 26, and then withdrawing the housing 10 by moving it to the left in FIG. 6.

It will be seen that during movement of the housing 10 to the right in FIG. 6, into its protective position, that the particular mounting of the lock 20 allows the lock 20 to "float", and move several degrees (e.g. about 6 degrees) to accommodate a wide variety of different type of clamp actuators and shackles.

It will thus be seen that according to the present invention an easy to manufacture, and versatile, locking device for an assembled trailer hitch or the like, has been provided. While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent structures and devices.

What is claimed is:

1. A locking device for an assembled trailer hitch having a clamp actuator for releasing it from its assembled position, said device comprising a U-shaped shackle having a closed end and two legs extending therefrom defining an open end; means for allowing operative connection of said U-shaped shackle at the closed end thereof to said clamp actuator; means for substantially completely covering said clamp actuator and said shackle to prevent access thereto and operation thereof, said means including a housing member having an open front end thereof for allowing sliding movement of said housing member over said clamp actuator and said shackle; and locking means for operatively engaging the legs of said U-shaped shackle and for operatively engaging said housing member so that selectively said housing member may not be moved with respect to said clamp actuator to allow access to and operation of said clamp actuator to release the assembled hitch; said locking means comprising a key operated lock; and means for mounting said lock adjacent a closed rear end of said housing member, said mounting means comprising means for mounting said lock so that it can move about six degrees so that it floats and therefore can readily move into alignment with the legs of said shackle.

2. A device as recited in claim 1 wherein said mounting means further comprises a ramp means for engaging and camming the shackle legs so that they move into proper alignment and operative association with the lock.

3. A locking device as recited in claim 2 wherein the ramp includes a pair of turned up ears formed on opposite sides of the ramp, said ears comprising cam means for camming the shackle legs toward each other and into operative assoication with the lock.

4. A locking device as recited in claim 3 wherein during relative movement of the housing member into operative association with, and preventing access to, the clamp actuator, it is moved in a first linear direction; and wherein said ramp makes an angle of generally about 30 degrees with respect to that direction, and said turned up ears also make an angle of generally about 30 degrees with respect to that linear direction.

5. A locking device as recited in claim 1 wherein said lock mounting means comprises first and second components, said first component distinct from said housing member being operatively connected to the lock and having first and second portions thereof extending at generally a right angle with respect to each other; and said second component being connected to said first component and to a bottom face of said housing, said second component including a first portion actually connected to the bottom face of the housing, and a second portion connected to the first component.

6. A locking device as recited in claim 5 wherein said first component is supported to said lock by foam tape.

7. A locking device as recited in claim 6 wherein said foam tape comprises adhesive foam tape; and further comprising a piece of foam tape at the top of the lock.

8. A locking device as recited in claim 6 wherein said second mounting component further comprises ramp means extending therefrom toward the open front end of said housing member, said ramp means being disposed at an angle with respect to the bottom of the housing so as to cam the shackle legs upwardly toward the lock.

9. A locking device as recited in claim 8 wherein the ramp includes a pair of turned up ears formed on opposite sides of the ramp, said ears comprising cam means for camming the shackle legs toward each other into operative association with the lock.

10. A lock device as recited in claim 8 further comprising one or more fasteners connecting the second portion of the second mounting component to the second portion of the first mounting component.

11. A locking device for an assembled trailer hitch having a clamp actuator for releasing it from its assembled position, said device comprising a U-shaped shackle having a closed end and two legs extending therefrom defining an open end; means for allowing operative connection of said U-shaped shackle at the closed end thereof to said clamp actuator; means for substantially completely covering said clamp actuator and said shackle to prevent access thereto and operation thereof, said means including a housing member having an open front end thereof for allowing sliding movement of said housing member over said clamp actuator and said shackle; and locking means for operatively engaging the legs of said U-shaped shackle and for operatively engaging said housing member so that selectively said housing member may not be moved with respect to said clamp actuator to allow access to and operation of said clamp actuator to release the assembled hitch; said lock means comprising a key operated lock; and means for mounting said lock adjacent a closed rear end of said housing means above the bottom of said housing, and adjacent the top thereof, and ramp means leading from said bottom to said lock for camming the shackle legs upwardly into operative association with the lock; said mounting means comprising a first component for actually engaging the lock, and a second component affixed to the bottom of the housing, said second component including as a part thereof said ramp means.

12. A locking device as recited in claim 11 wherein the ramp includes a pair of turned up ears formed on opposite sides of the ramp, said ears comprising cam means for camming the shackle legs toward each other into operative association with the lock.

13. A locking device as recited in claim 12 wherein during relative movement of the housing member into operative association with, and preventing access to, the clamp actuator, it is moved in a first linear direction; and wherein said ramp makes an angle of generally about 30 degrees with respect to that direction, and said turned up ears also make an angle of generally about 30 degrees with respect to that linear direction.

14. A locking device as recited in claim 11 wherein said first mounting component is connected to said lock by adhesive foam tape.

15. A locking device comprising:
a metal housing having six faces, a first open front end, a second closed rear end, a closed top, a closed bottom having a slot therein, and closed left and right sides;
a lock;
means for mounting said lock in said housing adjacent said rear end and top thereof, said mounting means including: adhesive foam tape; a first mounting component having first and second portions disposed at substantially a right angle with respect to each other, each of said first and second portions operatively abutting said lock through said foam tape; and a second mounting component, said second mounting component affixed to one or more of said housing faces, and including ramp means sloping upwardly from said bottom face towards the top face in the direction from said front end to said rear end.

16. A locking device as recited in claim 15 wherein said ramp means includes upturned ear portions adjacent the top thereof, said upturned ear portions making an angle with respect to the direction extending from the front end to the rear end of said housing.

17. A locking device as recited in claim 16 wherein said ramp means upturned ear portions are disposed on opposite sides of said ramp means, said ears comprising cam means for camming the shackle legs toward each other and into operative association with the lock.

18. A locking device as recited in claim 15 further comprising means defining an opening in said closed top of said housing; wherein said lock includes a key-receiving opening therein; and wherein said means for mounting said lock mounts said lock so that said key receiving opening therein is disposed immediately below, adjacent, and in operative association with, said opening formed in said housing closed top.

* * * * *